UNITED STATES PATENT OFFICE.

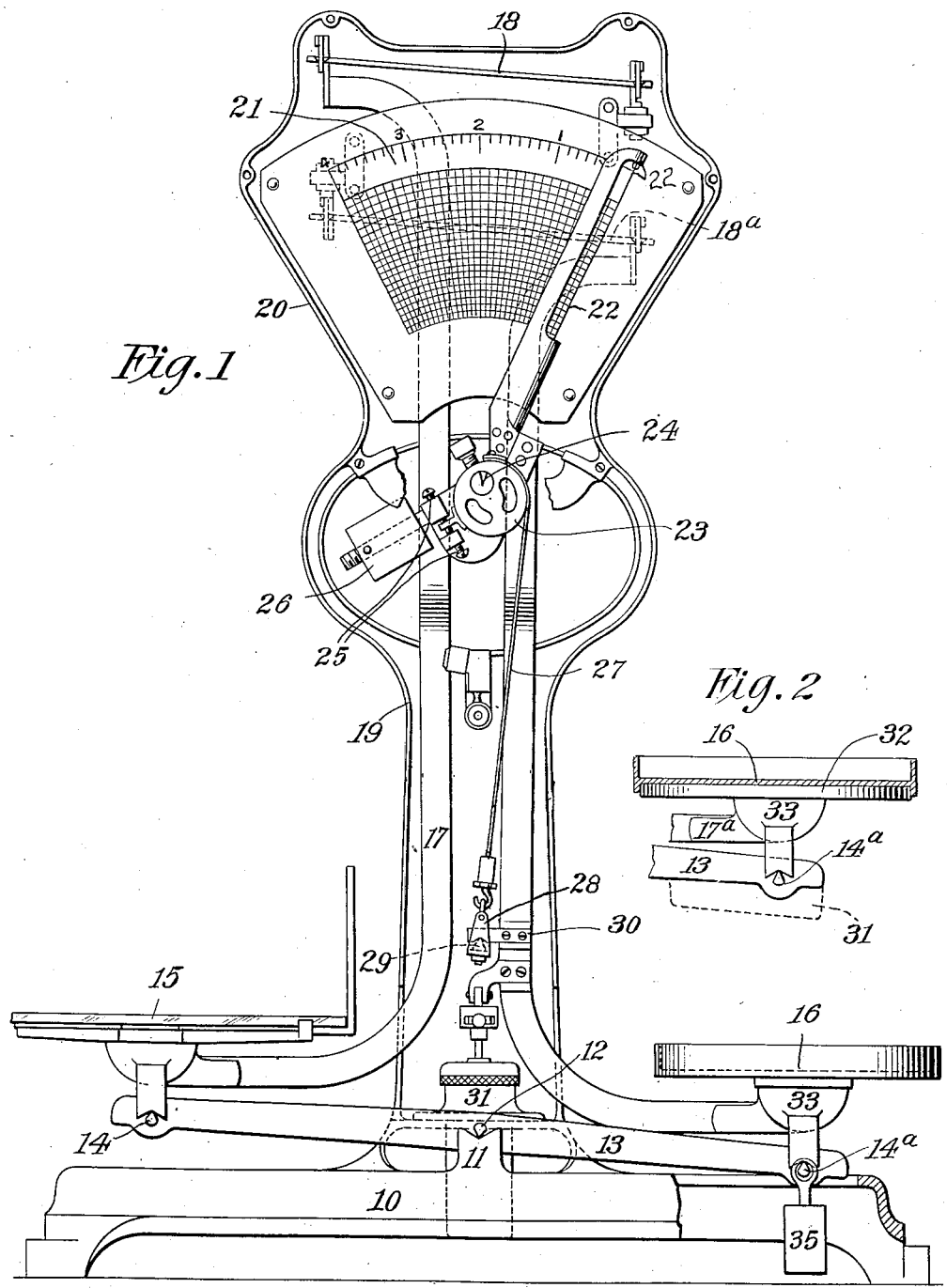

JOSEPH HOPKINSON, OF DAYTON, OHIO, ASSIGNOR TO THE COMPUTING SCALE COMPANY, OF DAYTON, OHIO, A CORPORATION OF OHIO.

SCALE.

1,291,890.     Specification of Letters Patent.     Patented Jan. 21, 1919.

Application filed April 6, 1917. Serial No. 160,085.

*To all whom it may concern:*

Be it known that I, JOSEPH HOPKINSON, a citizen of the United States, residing at Dayton, county of Montgomery, and State of Ohio, have invented certain new and useful Improvements in Scales, of which the following is a full, clear, and exact description.

This invention relates to certain new and useful improvements in the scale shown and described in my Patent No. 817,777.

The objects of the present invention reside in certain modifications of the scale shown in the above mentioned patent, whereby a descending pendulum may be used to counterbalance fractional loads and to so associate the additional parts that correct weighing may be effected. Other objects of the invention will be pointed out hereafter.

In the drawings:

Figure 1 shows a front elevation of my improved scale.

Fig. 2 is a detail view showing a weight pan and a different method of elevating the pendulum.

In more detail, 10 is the base of the scale having a central bearing 11 which coöperates with knife edges 12 upon the equal arm lever 13. The equal arm lever 13 carries at its ends the usual knife edge pivots 14 and 14ª which support the goods-receiver 15 and the weight pan 16. The goods-receiver 15 is supported upon the equal arm lever 13 through an intermediate check 17. This check extends upwardly in the housing and at its upper end it is pivotally connected with the usual check link 18. It will be understood that the length of the check link 18 is equal to the distance between knife edges 12 and 14, thereby maintaining the goods-receiver 15 in horizontal parallelism. Weight pan 16 is similarly supported to the knife edges 14ª by a check member 17ª, which also connects at its upper end with a check link 18ª, thereby maintaining the weight pan 16 in horizontal parallelism.

Supported on the base is a pedestal 19 enlarged at its upper end at 20 to form a chart housing. Within this chart housing is a weight and computing chart 21. An indicator hand 22 is adapted to move over this chart and indicate the weight and the corresponding computed cost. The indicator hand is rigidly connected to a cam 23 which is pivotally supported in any desired manner, as by knife edges 24. Fastened to the cam, preferably through the adjustable connection 25, is a pendulum 26. This pendulum 26 is normally maintained in elevated position, but upon the application of load to the goods receiver is adapted to descend and indicate the load on the goods-receiver not counterbalanced by an equal weight on the weight pan 16. In order to effect this proportional movement of the pendulum 26 and indicator arm 22 I provide a flexible tape 27, which, at its upper end, is fastened to the cam 23, and which, at its lower end, through a stirrup 28, and the conical bearing pivot 29 coöperates with the bearing in a nose iron 30 carried by the check member 17ª. It will be understood that as pan 16 rises, check member 17ª will also rise, thereby allowing the tension on the tape 27 to be relieved and pendulum 26 to descend.

In order to dampen the oscillations of the even balance beam, I provide the usual dash pot 31, but it will be unnecessary to describe this dash pot with its connections to the scale since a similar dash pot is shown and described in the patent heretofore referred to.

In order to maintain the pendulum 26 in elevated position when there is no load upon the scale, it is necessary that some means be provided for over-balancing the even balance lever 13 at one side of its fulcrum. Several means of over-balancing this lever may be used. The extreme right-hand end may be made weighty, but this method has the disadvantage of tending to cause errors to occur due to the pendulum action of the lever. Instead I preferably overbalance the lever by applying to the knife edge pivots 14 excess weight. This is preferably done by weighting pan 16 as shown at 32 in Fig. 2, or excess weight may be added in the shot cup 33, or the check arm 17ª may be made weighty. I may also apply a supplementary pendant weight 35 which brings pendant below pivot 14. I prefer the first mentioned methods, however, as the overbalancing weight will serve to maintain the bearings in close contact with the knife edges against the tendency of the pendulum to lift the bearing from the knife edges.

The operation of the scale will be self-evident from the drawing. On the application of a weight to the goods receiver the amount of this weight can be read directly from the combined weight and computing chart 21. Should the weight on the goods-receiver exceed the capacity of the chart, it will be necessary to apply counter-poising weights on the weight pan 16 until the excess weight is again indicated by the indicator hand 22 on chart 21. Then the total weight on the goods-receiver will be equal to the indicated weight plus the weight of the weights on the weight pan 16.

It will be understood that my invention may be modified in various ways, as will occur to those skilled in the art.

What I claim as my invention is more particularly pointed out in the appended claims.

I claim:

1. In a scale, in combination, a lever fulcrumed between its ends and having a goods-receiver pivoted upon one end thereof, check-devices for maintaining the said receivers horizontal, an indicator supported above the lever and adapted to swing over a chart, a counterbalancing pendulum connected with the indicator and with the check-device which is associated with the weight-receiver, an overbalancing means pivotally supported upon the weight-receiver end of the aforesaid lever for overbalancing the lever and maintaining the pendulum in elevated position when there is no load upon the scale.

2. In a scale, in combination, a lever fulcrumed between its ends and having a goods-receiver pivoted upon one end thereof, a weight-receiver pivoted upon the opposite end of the lever, check-devices for maintaining the said receivers horizontal, an indicator supported above the said lever and adapted to swing over a chart, a counterbalancing pendulum connected with the said indicator and with the check-device which is associated with the weight-receiver, and overbalancing means adapted to overbalance the lever and maintain the pendulum in elevated position when there is no load upon the scale, said overbalancing means comprising a weighty part associated with the weight-receiver.

3. In a scale, in combination, an even-balanced lever having a knife edge fulcrum and having knife edges at its end, a support for said fulcrum, a goods-receiver supported on one of the aforesaid knife edges, a weight-receiver supported upon the other knife edges, a pivotally supported indicator and a pendulum connected therewith, a weight-chart over which said indicator is adapted to be swung by said pendulum, a check-device to maintain said weight-receiver horizontal, means for moving said pendulum and said indicator in unison with the lever, said means comprising a flexible connection between the pendulum and the said check-device, and an overbalancing weight pivotally supported upon the knife edges which support the weight-receiver, said overbalancing weight being adapted to overbalance the lever and maintain the pendulum elevated when there is no load upon the scale.

In testimony whereof I hereunto affix my signature.

JOSEPH HOPKINSON.